Patented June 20, 1944

2,352,064

UNITED STATES PATENT OFFICE 2,352,064

REFINING MINERAL OIL

Carl Zerbe, Hamburg, Germany; vested in the Alien Property Custodian

No Drawing. Application June 24, 1941, Serial No. 399,555. In Germany December 20, 1937

2 Claims. (Cl. 196—41)

This invention relates to a method of refining mineral oil.

In the process of refining mineral oil after the dry refining method by means of sulphuric acid one proceeds generally in such a manner that after acidification of the oil with sulfuric acid the acid constituents contained in the acidified oil are neutralized by means of an excess of dry lime, the neutralized oil then being subjected, without preliminarily separating the lime, to a further purification and bleaching earth. In this procedure, the lime used for neutralizing the acidified oil passes into the decolorizing clay, partly in its original form, and partly in its converted form as lime salt (soap), so that the resulting spent, oil-containing decolorizing clay still contains the total amount of converted lime compounds corresponding to the amount of lime which had been applied.

Now, if it would be attempted to reactivate this used clay after removal of the adhering oil and colorizing substances, it would be found that the decolorizing clay can be reactivated to a reduced decolorizing efficiency only, corresponding to the content of lime compounds, since the lime compounds are inactive and even hamper the decolorizing process. On account of their insolubility the removal of the lime compounds would be so expensive and difficult that reactivation of such lime-containing clays would not offer any advantages.

I have now found that a practically complete reactivation of spent clays can be achieved by treating the oil after its acidification with basically reacting compounds which are adapted to form soluble salts in water or in neutral organic solvents, then treating the oil with decolorizing clay, and treating the spent clay separately with at least two solvents, the first solvent being one which is adapted to dissolve the oil constituents contained in the decolorizing clay and the second solvent or solvents being adapted to dissolve the resinous constituents and the reaction products of the basically reacting compound used as a neutralizing agent.

Suitable organic and basically reacting compounds are, for instance, organic bases, such as, aniline, toluidine, amines, etc., and suitable inorganic, basically reacting compounds are alkalis, carbonates, magnesite and, best of all, ammonia. Ammonia may be used in its gaseous form where it is intended to maintain the principle of dry refining, but a concentrated solution of aqueous ammonia is also suitable.

I have found that compared to lime, ammonia also offers the advantage that the acid constituents contained in the acidified oil from the acidification are decolorized or bleached, so that the spent clay which with lime as a neutralizing agent would be of quite dark colour, shows a light yellow to brown colour where ammonia is used. The refined oil products resulting by neutralizing with ammonia are at least equivalent to those obtained by neutralizing with lime.

The oil contained in the spent decolorizing clay can be completely separated from the clay by extraction with benzene or gasoline, while the resinous constituents can be extracted by a mixture of a neutral solvent, such as benzine (motor sprit) or benzol combined with a polar solvent, such as alcohol, acetone etc. A very suitable mixture consists of benzine with about 10 percent alcohol. The clay from which the oil thus has been removed, when treated with hot water, will be found to have its original adsorbing efficiency which even after repeated regeneration is not lost.

The process according to the invention can be applied to any kind of decolorizing clay.

In some instances, it may be advantageous, with a view to rendering the clay more suitable for the regeneration, to remove the acid resin as fully as possible after the acidification, and before the neutralization of the oil, by adding substances accelerating the precipitation of the acid resin, such as, lime, water, cement etc. This causes precipitation of asphalts and resinous substances and permits easy removal from the oil of said substances which without said precipitation and removal therefrom would enter into the clay during the next steps of the treatment. The bases may be used in the form of liquids, but it is also possible to use the same in their gaseous state (for instance, ammonia) or in their solid state (for instance, soda).

Further, I have found that it is advantageous to use a slightly wet clay. The wetting may be effected by the residue of water remaining in the oil from the above mentioned addition of water, or by the water added to the oil or to the clay in any other manner.

Example 1

A heavy distillate of engine oil was acidulated with sulphuric acid; after mixing, water was added (about 10 percent by weight of the sulphuric acid) and the mixture was stirred and exposed to a gravity settling process.

After the settling the oil was neutralized with ammonia and treated with clay. The spent clay was reactivated by successive treatment with benzine, a benzine alcohol mixture and water. It will be seen from the table that the clay on being revivified four times in the above described manner still had its original decolorizing efficiency.

| Treatment | Neutralisation number | A. S. T. M. colour number ||| Steam emulsion number |
| | | Immediately after neutralisation and treatment with clay | After 5 hours treatment at 100° C. in the presence of iron | Ditto after 10 hours | |
| --- | --- | --- | --- | --- | --- |
| 4 per cent $H_2SO_4$ (+$H_2O$) refined with $NH_3$ and 3 per cent clay— | | | | | Seconds |
| With fresh clay | 0.03 | −2½ | +2½ | +3 | 100 |
| With spent clay reactivated four times | 0.03 | −2½ | +2½ | +3½ | 90 |

In the above table "neutralisation number" is the amount in milligrams of KOH (potassium hydroxide) required for neutralizing the acids (organic and inorganic) contained in 1 gram of oil. The A. S. T. M. color number relates to the glass colour standards of the A. S. T. M. Union Colorimeter (method 5b/36, A. S. T. M. D155–34 T.), while the steam emulsion number relates to the A. S. T. M. steam emulsion test (method 44/36, A. S. T. M. method D157–36).

*Example 2*

50 tons of a heavy engine oil re-distillate were acidulated with 4 percent sulphuric acid at about 40° C., as usual. After intensive mixing, water was added (10 percent of the amount of sulphuric acid). After short mixing and settling, the deposited acid tar was removed and the oil was neutralized with 0.6 percent by weight of magnesite at 70° C. and decolorized with 3 percent by weight of clay. The spent clay was reactivated as described in Example 1. On refining the heavy engine oil the following results were obtained:

| Treatment | Neutralisation number | A. S. T. M. colour number ||| Steam emulsion number |
| | | Immediately after neutralisation and treatment with clay | After 5 hours treatment at 100° C. in the presence of iron | Ditto after 10 hours | |
| --- | --- | --- | --- | --- | --- |
| 4 per cent $H_2SO_4$ (+$H_2O$) neutralised with magnesite and decolorized with 3 per cent clay— | | | | | Seconds |
| With fresh clay | 0.03 | −2½ | +2½ | +3 | 100 |
| With spent clay reactivated four times | 0.03 | −2½ | +2½ | +3½ | 90 |

The method of the present invention has been described in detail with reference to specific embodiments. It is to be understood, however, that the invention is not limited by such specific reference but is broader in scope and capable of other embodiments than those specifically described.

I claim:

1. In a method of refining mineral oil, the steps which comprise acidifying a batch of oil, neutralizing the acidified oil by settling by means of ammonia, treating the oil with a decolorizing clay, reactivating the spent decolorizing clay by treating it at first with benzine, then with a benzine alcohol mixture, and finally with water, and using the reactivated decolorizing clay for another batch of oil.

2. In a method of refining mineral oil, the steps which comprise acidifying a portion of the oil, neutralizing the oil after settling by means of ammonia, treating the oil with a decolorizing clay, and reactivating the spent clay for reuse by treating the clay successively first with benzine and then with a mixture of benzine and ten percent of alcohol and finally with water.

CARL ZERBE.